July 19, 1938.  H. L. PIKE  2,123,911
AUTOMATIC CLUTCH
Filed Feb. 27, 1931  2 Sheets-Sheet 1

Henry Loyd Pike
INVENTOR

BY Victor J. Evans
and Co. ATTORNEYS

July 19, 1938. H. L. PIKE 2,123,911
AUTOMATIC CLUTCH
Filed Feb. 27, 1931 2 Sheets-Sheet 2

Henry Loyd Pike
INVENTOR

BY Victor J. Evans
and Co. ATTORNEY

Patented July 19, 1938

2,123,911

UNITED STATES PATENT OFFICE 2,123,911

AUTOMATIC CLUTCH

Henry Loyd Pike, Greensboro, N. C., assignor, by direct and mesne assignments, to Bragg-Kliesrath Corporation, South Bend, Ind., a corporation of New York Application February 27, 1931, Serial No. 518,857

3 Claims. (Cl. 192—91)

This invention relates to improvements in automatic clutches of the character set forth in my co-pending application, filed February 14, 1931, Serial No. 515,886 and has for the primary object, the provision of a cushioning means for the piston to retard the movement of the latter when permitting the clutch of the motor vehicle to engage so that starting of the vehicle in either of its gears will be gradual and smooth.

Another object of this invention is the provision of the cushioning means so constructed that the same may be of a pneumatic, fluid or vacuum type.

A further object of this invention is the provision of an automatic clutch attachment of the above stated character which will be simple, durable and efficient and which may be manufactured and sold at a comparatively low cost.

With these and other objects in view, this invention consists in certain novel features of construction, combination and arrangement of parts, to be hereinafter more fully described and claimed.

For a complete understanding of my invention, reference is to be had to the following description and accompanying drawings, in which—

Figure 1:
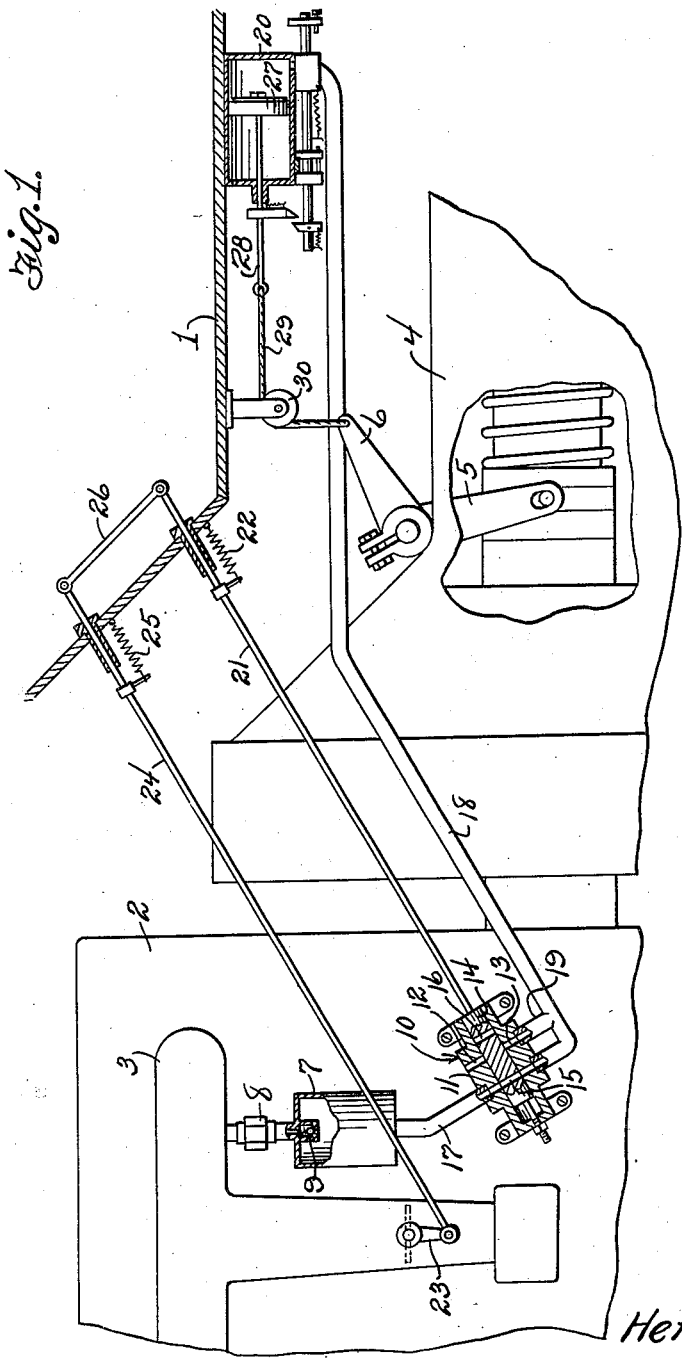
Figure 1 is a fragmentary view partly in elevation and partly in section, showing a portion of a motor driven vehicle with my invention applied and the clutch in released position.

Referring in detail to the drawings, the numeral 1 indicates a fragmentary portion of a motor vehicle having associated therewith the internal combustion engine 2 provided with the intake manifold 3 and clutch 4. The clutch 4 is of a conventional type and operated by the movement of a pivoted arm 5 having a right angularly disposed extension 6 to which a portion of my invention is applied. A vacuum tank 7 is connected to the intake manifold 3 by a pipe 8 and is equipped with a check valve 9 so that the operation of the engine will create a vacuum within the tank 7. A valve 10 is mounted on the vehicle adjacent the engine 2 and includes a casing 11 having oppositely disposed pairs of ports 12 and 13, respectively, and which are controlled by a valve member 14 having spaced passages 15 and 16. The vacuum tank 7 is connected to one of the ports 11 by a pipe 17 while the companion port is opened to the atmosphere as shown in Figure 1. A pipe 18 having branches 19 at one end and which are in communication with the ports 13 and the opposite end of said pipe 18 is in communication with one end of a cylinder 20 mounted on the vehicle 1. The valve member 14 is connected to an operating rod 21 extending through the floor-board of the vehicle 1 and is normally urged in one direction by a tension spring 22 for the purpose of establishing communication between the vacuum tank 7 and the cylinder 20.

The fuel control valve 23 associated with the intake manifold 3 of the engine 2 is provided with an operating rod 24 which is tensioned by a spring 25. The operating rod 24 extending through the floor-board of the vehicle 1 is pivotally connected to a foot pedal 26 which is in turn pivoted to the valve actuating rod 21.

A piston 27 is slidably mounted in the cylinder 20 and the stem 28 thereof extends outwardly of the cylinder and is connected to a cable 29 which is trained over a guide pulley 30 and secured to the end of the extension 6 of the clutch operating lever 5.

The foregoing description relates to the type of automatic clutch described, claimed and illustrated in my co-pending application and the operation thereof is briefly stated as follows: When the passage 15 of the valve member establishes communication between the vacuum tank 7 and the cylinder 20, a partial vacuum will be developed within the cylinder 20 to draw the piston 27 in one direction to disengage the clutch and when the valve member 14 is positioned to align the port 13 with one of the ports 12 leading to the atmosphere, the partial vacuum within the cylinder 20 will be destroyed permitting the clutch to engage or the moving parts thereof to come together.

My present invention as claimed in this application is a cushioning means for retarding the movement of the piston 27 when the vacuum is destroyed so as to prevent the clutch from engaging too rapidly and causing a sudden starting of the motor vehicle when said clutch is engaged.

Figure 2:
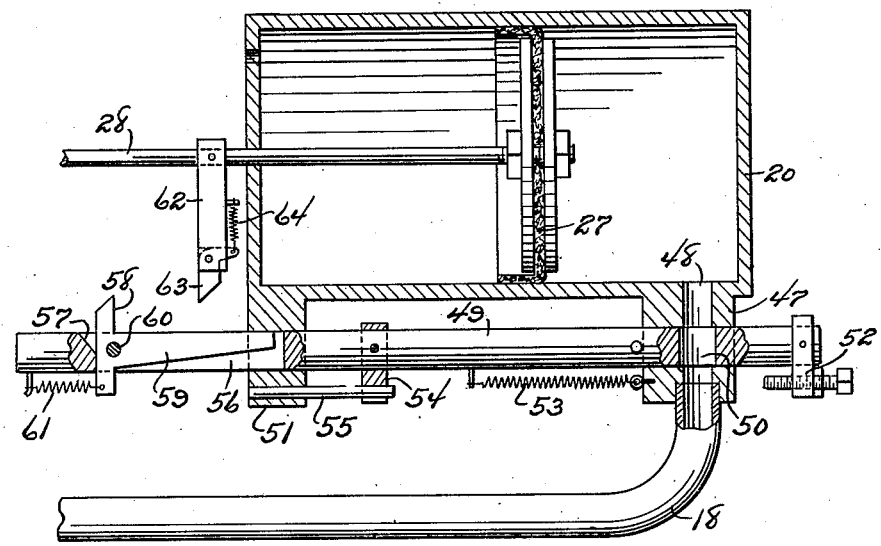
Figure 2 is a similar view illustrating another modified form of my invention.
Figure 3:
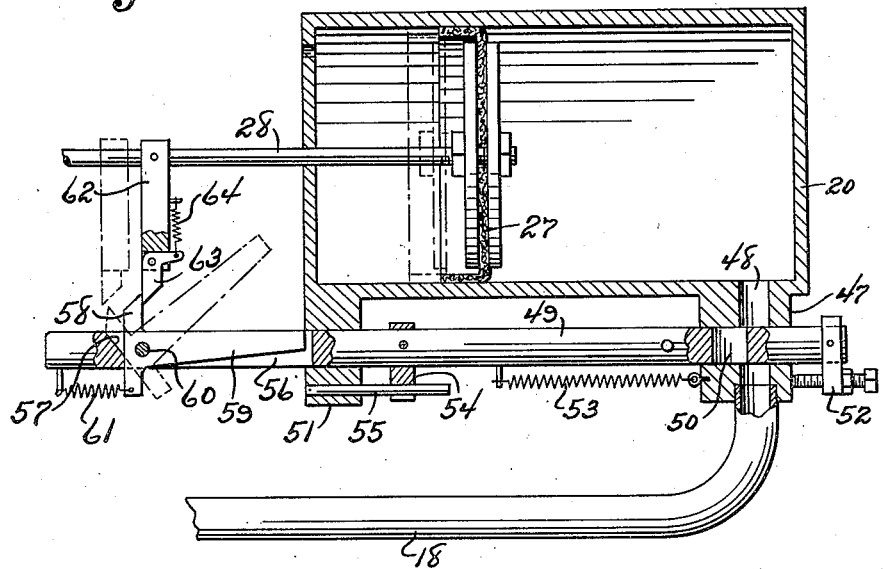
Figure 3 is a similar view showing the piston as being retarded in its movement to release the clutch which is regulated by controlling the vacuum acting thereon.

Referring to Figures 2 and 3, disclosing a cushioning means, the cylinder 20 has formed thereon a nipple 47 provided with a passage 48 in communication with the vacuum pipe 18. A valve member 49 is slidably mounted in the nipple 47 and is provided with a passage 50 for controlling the passage 48 and is also slidably mounted in a bracket 51 formed on the cylinder 20. The valve member 49 is in the form of a slidably mounted rod having secured to one end an adjustable stop 52 for engaging the neck 47 to limit the movement of the valve member in one direction and said valve member is urged in an opposite direction by a tension spring 53. The valve member 49 is prevented from rotating but allowed free sliding movement by a collar 54 secured thereto by slidably engaging a guide member 55 carried by the bracket 51. The valve member is provided with a slot 56 having one end wall bevelled to form an inclined stop 57 to be engaged by the head 58 of a trigger 59 which is pivotally mounted within the slot as shown at 60. The head extends at right angles to the shank of the trigger 59 while the shank normally lies within the slot 56 of the valve member due to the action of a tension spring 61. A trip arm 62 is secured to the stem 28 of the piston 27 and carries a pivoted dog 63 normally held in a tripping position by a tension spring 64. The free end of the dog 63 is bevelled as clearly shown in Figures 2 and 3 and also one end of the head of the trigger 59 is bevelled to permit the movement of the trip arm 62 in one direction with the piston 27 without affecting the trigger 59 but when moved in an opposite direction the dog rocks the trigger into the dotted line positions shown in Figure 3.

Normally the valve member 49 is positioned to establish communication between the vacuum pipe and the cylinder 20 and when the clutch has been disengaged by the establishment of a partial vacuum and it is desired to engage the clutch by breaking the vacuum through the operation of the valve 10, the piston 27 starts to move toward the left of Figure 2, causing the trip arm 62 and its pivoted dog 63 to engage the trigger 59 and slide the valve member 49 to the left of Figure 2 reducing the passage between the cylinder 20 and the vacuum pipe 18, consequently retarding the destroying of the partial vacuum which slows the movement of the piston in the last named direction permitting the clutch to engage gradually and smoothly. When the clutch has engaged, the trigger 59 occupies a dotted line position as shown in Figure 3 and the dog 63 passes beyond the head 58 which frees the valve member 49 and permits the latter to return to its initial position as shown in Figure 2.

While I have shown and described the preferred embodiment of my invention, it will be understood that minor changes in construction, combination and arrangement of parts, may be made without departing from the spirit and scope of the invention, as claimed.

Having thus described my invention, what I claim is:

1. In combination with a vacuum cylinder of a clutch operating means including a piston and a neck connected to a vacuum pipe, a valve member in the neck for controlling the passage between the vacuum pipe and the cylinder, a trigger carried by said valve member, and a trip carried by the piston to engage the trigger for moving the valve member in one direction.

2. In combination with a vacuum cylinder of a clutch operating means including a piston and a neck connected to a vacuum pipe, a valve member in the neck for controlling the passage between the vacuum pipe and the cylinder, a trigger carried by said valve member, a trip carried by the piston to engage the trigger for moving the valve member in one direction, and tension means for urging the valve member in an opposite direction.

3. The combination in a motor car, of an internal combustion engine, a clutch controlling element, an appliance to impart clutch-disengaging movement to said element, a conduit between said appliance and the intake manifold of the engine, a valve for opening communication thru such conduit to effect clutch-disengaging movement of said appliance, a second valve in said conduit operable by said appliance after it has traveled a predetermined distance toward clutch engaging position for retarding the movement of the clutch after it approaches engaging position.

HENRY LOYD PIKE.